(12) United States Patent
Ferlitsch

(10) Patent No.: US 8,001,270 B2
(45) Date of Patent: Aug. 16, 2011

(54) METHOD AND APPARATUS FOR DISCOVERING A NETWORK ADDRESS

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1645 days.

(21) Appl. No.: 10/676,272

(22) Filed: Sep. 30, 2003

(65) Prior Publication Data
US 2005/0071507 A1 Mar. 31, 2005

(51) Int. Cl.
*G06F 15/16* (2006.01)
(52) U.S. Cl. ........................................................ 709/245
(58) Field of Classification Search .................... 709/245
See application file for complete search history.

(56) References Cited

U.S. PATENT DOCUMENTS

| | | | |
|---|---|---|---|
| 5,687,320 A * | 11/1997 | Wiley et al. .................... | 709/245 |
| 6,020,973 A | 2/2000 | Levine et al. | |
| 6,032,162 A * | 2/2000 | Burke ........................... | 715/207 |
| 6,219,151 B1 | 4/2001 | Manglapus et al. | |
| 6,889,252 B2 * | 5/2005 | Lacome D'Estalenx ..... | 709/220 |
| 7,102,778 B2 * | 9/2006 | Parry ........................... | 358/1.15 |
| 7,168,003 B2 * | 1/2007 | Lozano et al. ................. | 714/25 |
| 7,213,060 B2 * | 5/2007 | Kemp et al .................... | 709/222 |
| 7,228,365 B2 * | 6/2007 | Schlonski et al. ............. | 710/15 |
| 2002/0057449 A1 | 5/2002 | Chapman et al. | |
| 2002/0059489 A1 * | 5/2002 | Davis et al. .................... | 710/72 |
| 2002/0062366 A1 | 5/2002 | Roy et al. | |
| 2002/0099814 A1 | 7/2002 | Mastrianni | |
| 2003/0023732 A1 * | 1/2003 | Cohen ........................... | 709/229 |
| 2003/0055874 A1 * | 3/2003 | Simpson et al. .............. | 709/203 |
| 2003/0097425 A1 * | 5/2003 | Chen ............................. | 709/220 |
| 2003/0160988 A1 * | 8/2003 | Chapin et al. ................. | 358/1.13 |
| 2005/0044217 A1 * | 2/2005 | Moreau ......................... | 709/224 |
| 2005/0083966 A1 * | 4/2005 | Zodnik ......................... | 370/463 |
| 2007/0083621 A1 * | 4/2007 | Nuggehalli ................... | 709/221 |
| 2009/0106380 A1 * | 4/2009 | Asthana et al. ............... | 709/206 |

FOREIGN PATENT DOCUMENTS

| | | |
|---|---|---|
| EP | 0 874 306 | 10/1998 |
| WO | WO 01/33338 | 5/2001 |

* cited by examiner

*Primary Examiner* — Douglas B Blair
(74) *Attorney, Agent, or Firm* — Austin Rapp & Hardman

(57) ABSTRACT

A method and apparatus for discovering a network address. An exemplary method provides for communicating between a client device and a peripheral device over a network that includes a server device adapted to control the peripheral device. The network address of the peripheral device is determined to permit direct communication with the peripheral device, thereby bypassing the server device. The method includes reading a first data file of the server device. The first data file includes at least one of (a) the network address of the peripheral device, and (b) a network address of a second data file associated with and including the network address of the peripheral device. The method further includes comparing portions of at least one of the first and second data files with a predetermined data formatting pattern indicative of a network address.

35 Claims, 2 Drawing Sheets

METHOD AND APPARATUS FOR DISCOVERING A NETWORK ADDRESS

FIELD OF THE INVENTION

The invention relates generally to a method and apparatus for discovering a network address, and more particularly to a method and apparatus for discovering the network address of a physical peripheral device coupled to a network.

BACKGROUND OF THE INVENTION

Generally, a computer network ("network") is two or more autonomous computers coupled together for the purposes of sharing resources and information. For instance, a peripheral device, such as a printer, may be shared among computers on a network. A network provides a means for physical and logical devices to communicate with each other. Generally, the term "physical device" refers to hardware, while "logical device" refers to software. For example, a printer is a physical device, while software for use with the printer is a logical device. Every physical device coupled to a network has a network address, which is an identifier used by other devices for communicating with it. Similarly, each logical device on a network has a network path that is used to identify it. Many networks use the TCP/IP protocols (Transmission Control Protocol/Internet Protocol), and network addresses in such networks are referred to as IP addresses.

When a user running an application ("client"), such as a word processor, on a client computer wishes to print something, the user selects a logical printer, which may be one of several in a list, and issues a command to print the document. In response, the application program creates a "print job" which it sends to the local logical printer. A "logical printer" is software that accepts print jobs and performs spooling functions so that the application need not wait until all of the activities associated with printing are completed. The logical printer is a software module that may be part of the operating system ("OS"), but which may also be a separate proprietary software component. A logical printer is also referred to as a print server, a print queue, or a print spooler ("spool" being an acronym for simultaneous peripheral operations on-line). The logical printer typically stores the print job in the order it was received in a buffer along with any other pending print jobs (that is, it "spools" the print job). When the physical printer is ready to accept the print job, the logical printer reads the print job from the buffer and sends it to the physical printer (that is, it "de-spools" the print job). The physical printer that the print job is sent to may be a locally connected (e.g., parallel port, USB) printer or a network-connected printer. The network-connected printer may be accessed either as a locally installed printer ("logical local printer") or as a network-installed printer ("logical network printer"). In the former case, the printer is unmanaged and each user can establish a connection to the printer in an ad-hoc manner. In the latter case, the printer is managed at a centralized location (i.e., print server), and each user must instead establish a connection with the print server.

A logical network printer runs on a server computer coupled to the network and allows computers on the network to send print jobs without having to wait for the physical network printer. Because the physical network printer is a shared device that can be accessed by many computers, there is a need to coordinate and control access to it. This management function is provided by the logical network printer. In addition, the logical network printer commonly provides a few limited additional functions, such as the ability to cancel a print job or change the order of print jobs.

When a print job is sent to a locally installed printer connected to the network, the printing operation is referred to as peer-to-peer printing and the client computer must have the network address of the network-connected printer. If the OS in the client computer is a Microsoft® Windows OS, an OS software module known as a port monitor must have a means to obtain the network address of the network-connected printer. The port monitor uses the network address of the network-connected printer to send print jobs directly to it. On the other hand, when a print job is sent to a network-installed printer connected to the network, the printing operation is referred to as network printing, and the client side port monitor must have the network path of the logical network printer, and the server side port monitor associated with the logical network printer must have a means to obtain the network address of the network-connected printer. The client side port monitor uses the network path of the logical network printer to send print jobs indirectly to it.

Physical printers have evolved so that they are now capable of performing more than just printing. For instance, a multi-function peripheral or "MFP" is capable not only of printing, but also of scanning, copying, faxing, and document management operations. A print job can be sent from a client application on a client computer to an MFP in the same way it is sent to a physical printer, that is, as a peer-to-peer or network printing operation. However, a client application may not send other types of jobs or communications (e.g., device management protocols) through the logical network printer as if the other job were a network print job. The reason is that the logical network printer is simply not designed to accommodate the protocols for these types of jobs or communications. Because the logical printer is typically part of the OS, generally, only the provider of the OS is able to re-design the logical printer to accommodate additional protocols, and the provider of the widely used Microsoft Windows OS has only provided support for print and fax protocols. Therefore, a scan request or device management protocol (e.g., SNMP) must be sent directly from a client application to the physical MFP. In other words, for these operations, the client application must communicate with the MFP in a peer-to-peer mode.

As mentioned, in order for a client computer to communicate directly with the MFP it must have the network address of the MFP. If the client computer is configured to send print jobs to the MFP as a peer-to-peer printing operation, the port monitor has the means to obtain the network address of the MFP. The client application that needs to directly communicate with the MFP may be able to use an existing API (Application Program Interface) call to obtain the network address of the MFP from the port monitor, such as a Spooler API. If the client computer is configured to send print jobs to the MFP as a network printing operation, the logical network printer has the network address of the MFP. In this case, the client application that needs to directly communicate with the MFP may be able to use an existing RPC (Remote Procedure Call) to obtain the network address of the MFP from the logical network printer.

However, these methods for obtaining the network address of the MFP are not always available. For example, if the software module that reads the print job from the buffer and sends it to the physical printer (the module that performs the de-spooling function) is not part of the OS, but instead is a separate proprietary module, the network address of the MFP may not be obtainable. For example, Windows cannot use an existing API (Application Program Interface) call to obtain the network address of the MFP from the port monitor since the proprietary module, not the port monitor, is performing the network interface functions. In other cases, the port monitor itself may be the proprietary module which may or may not support a means to obtain the network address through an API call. As another example, if the OS in the client computer is Microsoft® Windows 95, Windows 98, or Windows Me, the network address of the MFP again cannot be obtained because these operating systems do not support the use of an RPC to obtain the network address of the MFP from the logical network printer.

Accordingly, there is a need for a method and apparatus for discovering the network address of a physical peripheral device coupled to a network.

SUMMARY

An exemplary method within the scope of the invention is provided for communicating between a client device and a peripheral device over a network that includes a server device adapted to control the peripheral device. The network address of the peripheral device is determined to permit direct communication with the peripheral device, thereby bypassing the server device. The method includes reading a first data file of the server device. The first data file includes at least one of (a) the network address of the peripheral device, and (b) a network address of a second data file associated with and including the network address of the peripheral device. The method further includes comparing portions of at least one of the first and second data files with a predetermined data formatting pattern indicative of a network address.

DETAILED DESCRIPTION

Figure 1:
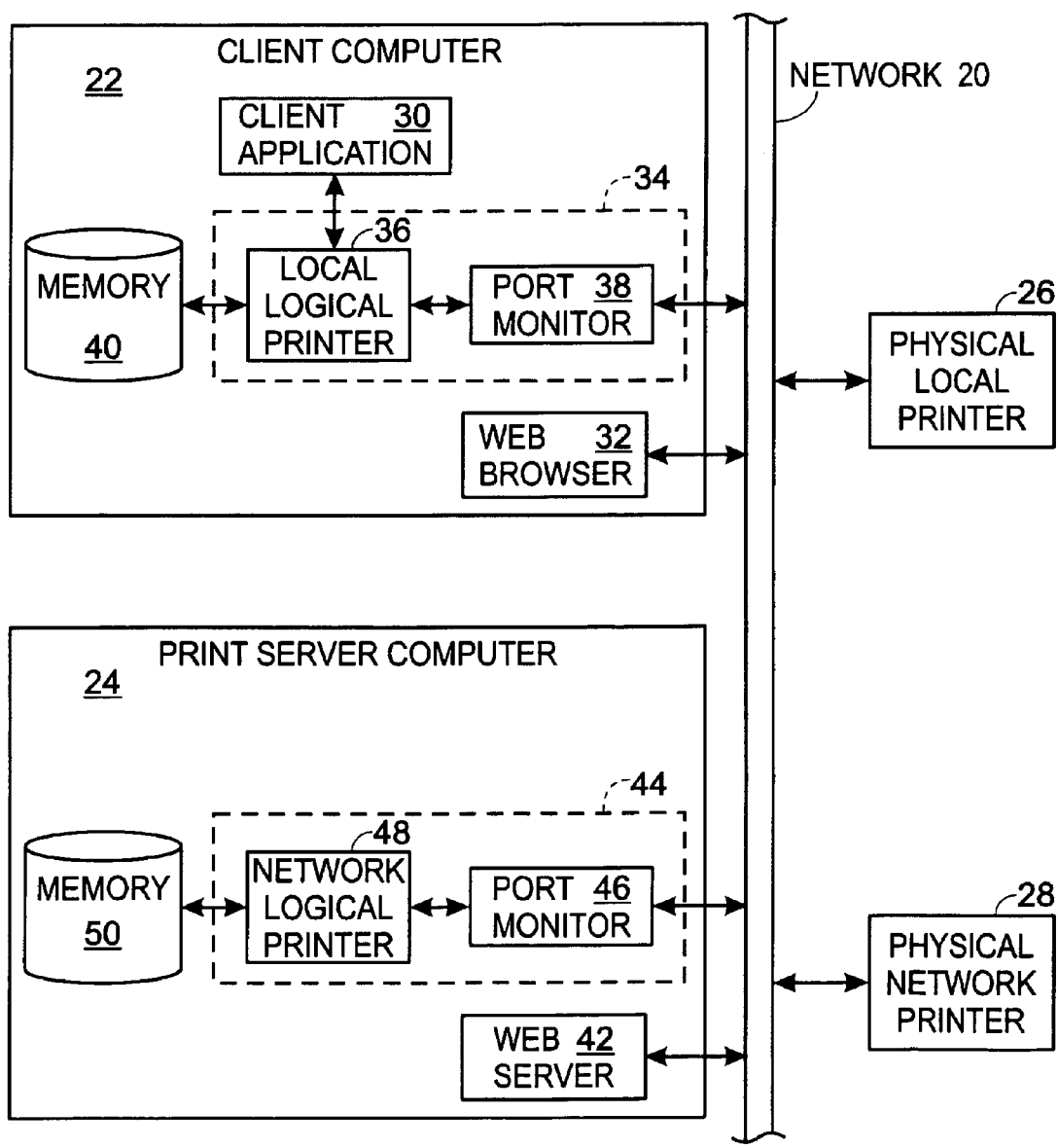
FIG. 1 is a block diagram of a known computer network that is a preferred context for the invention.

Reference will now be made in detail to the present preferred embodiments of the invention, examples of which are illustrated in the accompanying drawings. Wherever possible, the same reference numbers are used in the drawings and the description to refer to the same or like elements.

FIG. 1 shows a preferred context of the invention. FIG. 1 shows a block diagram of a known computer network 20 to which a client computer 22, a print server computer 24, a locally installed network-connected printer 26, and a network-installed network-connected printer 28 are coupled. Each device has a network address that is preferably an IP address. The network 20 may be any network known in the art, and may employ wired, optical, or wireless transmission media. The network may operate according to any known protocol, but preferably the network 20 uses the TCP/IP protocols. While only four devices are shown for purposes of illustration, it will be appreciated that any number of devices may be coupled to the network without parting from the principles of the invention.

The network-connected printers 26 and 28 may be any printing devices known in the art. The client computer 22 has an application program 30 and a web browser 32. The application program 30 may be any known application program, such as a word processing program. The client computer 22 has an OS 34 that includes at least one local logical printer 36 and port monitor 38. Preferably, a separate instance of the local logical printer 36 is provided for each physical printer on the network that a user may wish to use as a locally installed printer (i.e., peer-peer printing). Additionally, the client computer 22 has a memory 40. The print server computer 24 has a web server 42, an OS 44 which includes a port monitor 46 and a logical network printer 48, and a memory 48. The OS 34 may be Windows 95, Windows 98, or Windows Me, and the OS 44 may be Windows 2000 Server, Windows XP Server, or Windows 2003 Server.

The application program 30 in the client computer 22 may send a print job to the locally installed network-connected printer 26. After the user selects the logical printer 36 which may be associated with locally installed network-connected printer 26 and issues a print command, a print job is sent to the local logical printer 36. The logical printer 36 accepts the print job and spools it to the memory 40. When the locally installed network-connected printer 26 is ready to accept the print job the logical printer 36 fetches it from memory 40 and sends it to the physical printer via the port monitor 38 using the network address of the locally installed network-connected printer 26. On receipt of the print job, it is printed by the physical printer 26.

The application program 30 in the client computer 22 may also send a print job to the network-installed network-connected printer 28. After the user selects the logical printer 36 which may be associated with network-installed network-connected printer 28 and issues a print command, a print job is sent to the local logical printer 36, which is associated with the network-installed network-connected printer 28. The local logical printer 36 accepts the print job and spools it to the memory 40. When the network logical printer 48 is ready to accept the print job the local logical printer 36 fetches it from memory 40 and sends it to network logical printer 48 via the port monitor 38 using the network path of the logical network printer 48. On receipt of the print job, the network logical printer 48 stores the print job in memory 50 and when the network-installed network-connected printer 28 is ready, it sends the print job to the network-installed network-connected printer 28 via the port monitor 46 using the network address of the network-installed network-connected printer 28. On receipt at the network-installed network-connected printer 28, the print job is printed.

The OS 44, network logical printer 48, and the web server 42 are adapted to construct and provide a web page for the network printing services provided by the print server computer 24. This network printing services web page shows print queue related information for all shared locally and network-connected printers associated with the print server computer 24. In addition, the OS 44, the network logical printer 48, and the web server 42 are adapted to construct and provide a web page for the network logical printer 48. This network logical printer web page provides information specific to the network logical printer 48, such as printer properties and print jobs in its print queue. In an alternative preferred context for the invention, network logical printer web page constructed by the OS 44 may be replaced with a custom network logical printer web page. For Microsoft Windows Servers, the manufacturer of the printer 28 has the option of providing a custom network logical printer web page. In this preferred context, the network logical printer web page provided by the manufacturer is substituted for the one provided by the OS 44. All of these web pages may be accessed and viewed via the web browser 32.

Figure 2:
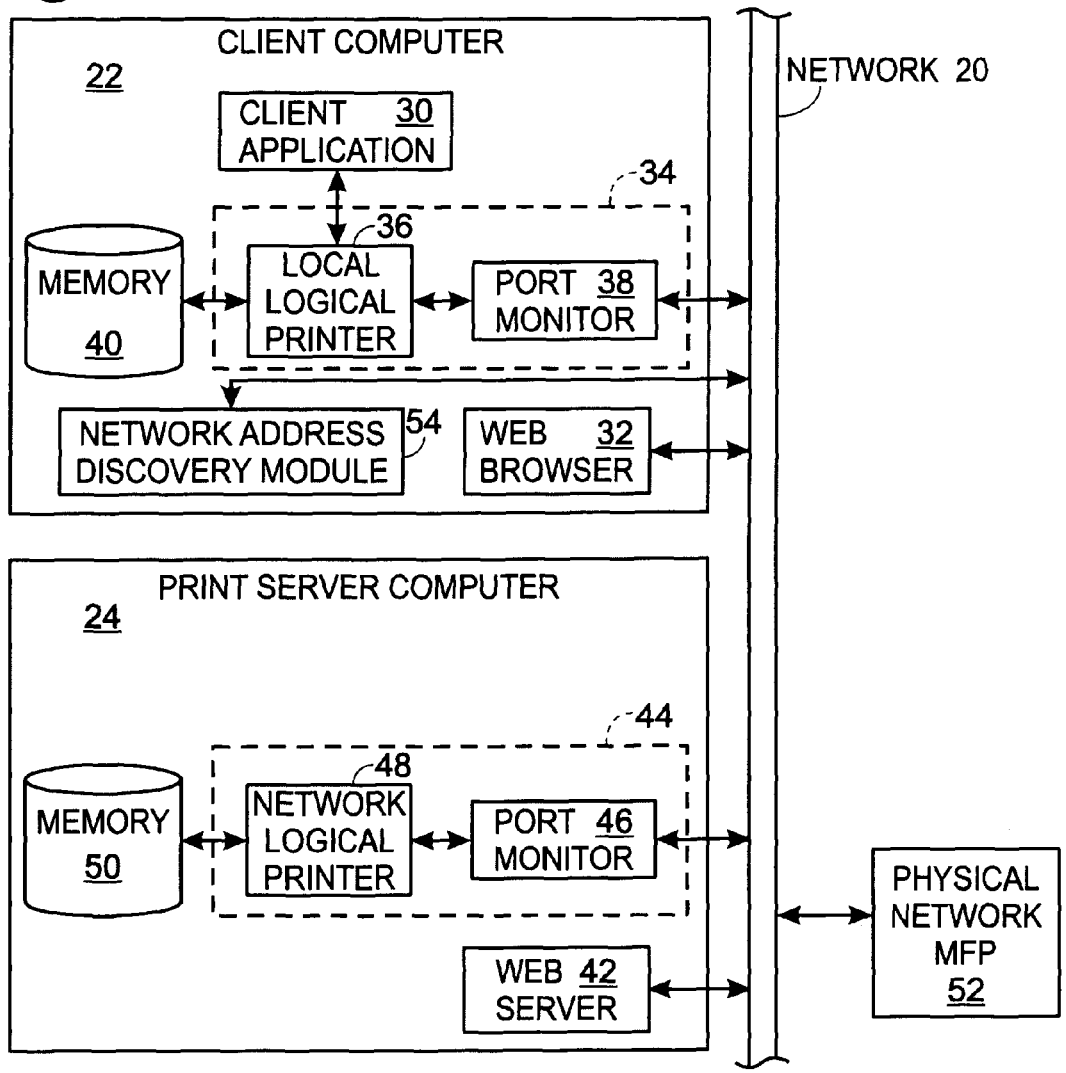
FIG. 2 is a block diagram of a computer network that includes a client computer having a network address discovery module according to the invention.

Turning now to FIG. 2, a block diagram illustrating one preferred embodiment of the invention is shown. FIG. 2 shows the computer network 20, the client computer 22, and the print server computer 24 of FIG. 1. In addition, the network 20 of FIG. 2 has a physical network MFP 54. The print server computer 24 includes the same components described with reference to FIG. 1. Similarly, the client computer 22 includes the same components described with reference to FIG. 1, and additionally includes a network discovery address module 54.

With respect to the printing function provided by the network-connected MFP 52, the client application 30 sends a print job to the network-installed network-connected MFP 52 (e.g., network printer in Microsoft Windows) as if it were the network-installed network-connected printer 28. In other words, the client application 30 sends a print job to the network MFP via the print server computer in a network printing operation. The client computer 22 must send other types of jobs (e.g., a scan request job) and communications (e.g., device management protocols) directly to the network MFP 52.

For these operations, the client computer 22 needs the network address of the MFP 52. However, a client application is not able to use an existing API call to obtain the network address of the MFP from the server side's port monitor, such as a Spooler API via an RPC to the print spooler on the print server, nor can a client application obtain the network address of the network MFP from the logical network printer (e.g., client side port monitor). The reason is that the OS 34 does not support these operations, or the port monitor 46 is a proprietary module from which OS 34 does not know how to obtain the information.

Figure 3:
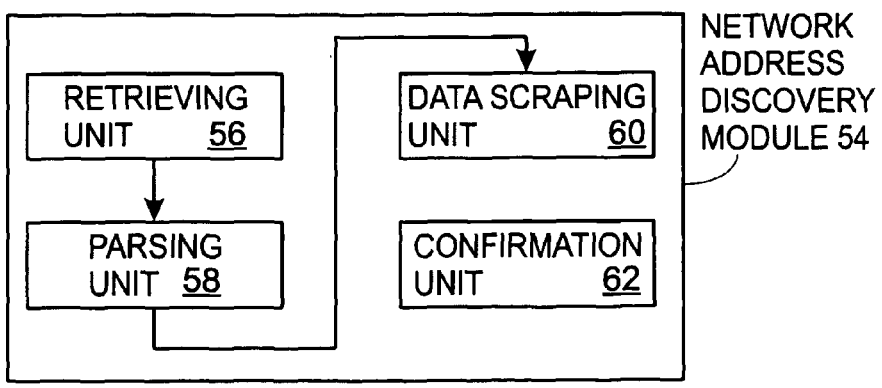
FIG. 3 a block diagram of the network address discovery module of FIG. 2.

Turning now to FIG. 3, the network address discovery module 54 is adapted to discover the network address of the network MFP 52. In one preferred embodiment, the network address discovery module 54 includes a retrieving unit 56, a parsing unit 58, a data scraping unit 60, and a confirmation unit 62.

The retrieving unit 56 may retrieve either the printing services web page, the OS created logical network printer web page, or the custom logical network printer web page, as appropriate. The custom logical network printer web page may contain a link to the network MFP web page (or embedded device web page). As is well known, a web page is represented by HTTP (hyper text transfer protocol) data. Thus, what is retrieved is a data file. While preferably retrieving unit 56 retrieves a web page, it is contemplated that any data file, in any format, may be retrieved.

The parsing unit 58 parses the retrieved data file (preferably, HTTP data) into components, such as meta tags, text blocks, and Java subroutines. The parsed components are separately analyzed by the data scraping unit 60 in order to identify a network address. The parsing unit 58 sends parsed data to the data scraping unit 60. In an alternative preferred embodiment, the parsing unit 58 is bypassed because it is not necessary for the particular type of data file.

The data scraping unit 60 employs one or more algorithms in which a portion of the HTTP data is compared with a predetermined data formatting pattern indicative of a network address. For example, the format for IP addresses is known to be "xxx.xxx.xxx.xxx," where each "x" is a number. In addition, other predetermined network address formats may be used as appropriate. For example, the format for the textual representation of an IP address, that is, an address in the format "http://www.webpage.com/," may be used. In addition to comparing a portion of the HTTP data to a predetermined data formatting pattern, the algorithms employing grammatical rules may be used to identify a network address. For instance, certain contextual data either preceding or following the network address may be used to identify a network address.

More than one network address may be identified or the network address identified may not be the particular address used to identify the network MFP 52. Thus, the identified network address or addresses are preferably passed to a confirmation unit 62, which verifies that the identified network address is, in fact, the address sought. The confirmation unit 62 may verify that the identified network address is the one sought by "pinging" the network MFP 52. Pinging refers to a utility for determining whether a specific IP address is accessible and works by sending a packet to the specified address and waiting for a reply. Alternatively, or in addition, the confirmation unit 62 may verify the identified network address by issuing an SNMP (Simple Network Management Protocol) query to the network MFP 52. The receiver of an SNMP query responds by returning data about itself, such as the printer's model name, serial number, location, DNS name, etc.

Another alternative method for verifying the identified network address is to request a printer device web page (or an embedded device web page) and compare it to the logical network printer web page. Further, in yet another alternative, a "test" command, e.g., a device management protocol or a test job, is sent to the network MFP 52. In this case, the user may manually confirm the test job outputted on the network MFP 52.

As mentioned, the network printing services web page shows print queue related information for all shared locally and network-connected printers associated with the print server computer 24. The network printing services web page may have the network address (e.g., HTTP links) of the network logical printer web page or custom network logical printer web page. These network logical printer web pages will generally have the network address of the network MFP 52. Further, the network or custom network logical printer web page may have the network address (e.g., HTTP link) to the network MFP 52 embedded device web page, which generally has the network address of the network MFP 52. However, the network printing services web page itself will generally not have the network address of the MFP 52. In the case in which the retrieving unit 56 retrieves the printing services web page, the network address discovery module 54 is used to discover the network address of either the network logical printer web page or custom network logical printer web page, as appropriate.

After this address is discovered, the network address discovery module 54 is used a second time to discover the network address of the network MFP 52. If the discovery module 54 fails to discover the network address of the network MFP 52, the discovery module may further examine the web page for the network address (e.g., HTTP link) to the network MFP 52 embedded device web page. If the network address of the network MFP 52 embedded device web page is found, the discovery module 54 is used a third time to discover the network address of the network MFP 52.

It is to be recognized that, while preferred methods and system according to the present invention have been shown and described, other methods and system incorporating one or more of the features described herein may be employed without departing from the principles of the invention. The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for communicating between a client device and a peripheral device over a network that includes the peripheral device, the client device, and a server device adapted to control the peripheral device, wherein the method is performed by the client device, the method comprising:
creating a print job, wherein the print job is to be sent to the peripheral device;
determining, after the print job is created, a network address of the peripheral device by the client device in response to the creation of the print job, wherein the peripheral device has a network address that is not known to the client device, and wherein determining includes:
retrieving, after the print job is created, a first data file from the server device by the client device, wherein the first data file is a web page;
parsing, after the print job is created, by the client device the retrieved first data file into one or more portions, wherein the one or more portions comprise metatags, text blocks or sub-routines that have been extracted from the web page;
comparing, after the print job is created, by the client device the one or more portions of the retrieved first data file with a predetermined data formatting pattern indicative of a network address, wherein all of the metatags, text blocks or sub-routines are compared with the formatting pattern;
identifying, after the print job is created, by the client device one or more portions of the retrieved first data file as network addresses; and
determining, after the print job is created, by the client device if a network address is the network address of the peripheral device, wherein determining includes sending a communication over the network;
addressing, after determining the network address of the peripheral device, the peripheral device using the determined network address of the peripheral device, wherein addressing the peripheral device occurs after the communication has been sent over the network; and
communicating directly with the peripheral device, thereby bypassing the server device.

2. The method of claim 1, wherein said first data file includes the network address of the peripheral device, and wherein said step of determining the network address of the peripheral device comprises comparing portions of said first data file with said pattern.

3. The method of claim 2, wherein said step of determining the network address of the peripheral device further comprises recognizing a match between a portion of said first data file and said pattern, identifying the portion as a network address, and identifying said network address as being the network address of the peripheral device.

4. The method of claim 1, wherein said first data file includes the network address of a second data file associated with and including the network address of the peripheral device, and wherein said step of determining the network address of the peripheral device comprises:
retrieving the second data file from the server device, wherein the second data file is a web page;
identifying one or more portions of the retrieved second data file as potential network addresses; and
comparing portions of said second data file with said pattern.

5. The method of claim 4, wherein said step of determining the network address of the peripheral device further comprises recognizing a match between a potential network address of said second data file and said pattern, identifying the potential network address as a network address, and identifying said network address as being the network address of the peripheral device.

6. The method of claim 5, wherein said step of determining if a network address is the network address of the peripheral device further comprises testing said network address to determine whether said network address is the network address of the peripheral device.

7. The method of claim 6, wherein said testing comprises sending a command to said network address.

8. The method of claim 6, wherein said step of determining if a network address is the network address of the peripheral device further comprises identifying said network address as being the network address of the peripheral device as a result of said testing.

9. The method of claim 4, wherein the second data file is an embedded device web page.

10. The method of claim 9, wherein the first data file is a network logical printer web page.

11. The method of claim 9, wherein the first data file is a printing services web page.

12. The method of claim 1, wherein the first data file is a network logical printer web page.

13. The method of claim 1, wherein the first data file is a custom network logical printer web page.

14. The method of claim 1, wherein the first data file is an embedded device web page.

15. The method of claim 1, wherein the peripheral device is a multi-function peripheral (MFP) communication.

16. The method of claim 1, wherein the print job is a device management protocol.

17. The method of claim 1, wherein determining by the client device if a network address is the network address of the peripheral device comprises pinging the peripheral device.

18. The method of claim 1, wherein determining by the client device if a network address is the network address of the peripheral device comprises issuing a Simple Network Management Protocol (SNMP) query to the peripheral device.

19. A memory readable by a machine embodying a program of instructions executable by the machine to facilitate communication between a client device and a peripheral device over a network that includes the peripheral device, the client device, and a server device adapted to control the peripheral device, the instructions being configured to:
create a print job, wherein the print job is to be sent to the peripheral device;
determine, after the print job is created, a network address of the peripheral device by the client device in response to the creation of the print job, wherein the peripheral device has a network address that is not known to the client device, and wherein determining includes:
retrieving, after the print job is created, a first data file from the server device by the client device, wherein the first data file is a web page;
parsing, after the print job is created, by the client device the retrieved first data file into one or more portions, wherein the one or more portions comprise metatags, text blocks or sub-routines that have been extracted from the web page;
comparing, after the print job is created, by the client device the one or more portions of the retrieved first data file with a predetermined data formatting pattern indicative of a network address, wherein all of the metatags, text blocks or sub-routines are compared with the formatting pattern;

identifying, after the print job is created, by the client device one or more portions of the retrieved first data file as network addresses; and determining, after the print job is created, by the client device if a network address is the network address of the peripheral device, wherein determining includes sending a communication over the network;

address, after determining the network address of the peripheral device, the peripheral device using the determined network address of the peripheral device, wherein addressing the peripheral device occurs after the communication has been sent over the network; and communicate directly with the peripheral device, thereby bypassing the server device.

20. The memory of claim 19, wherein said first data file includes the network address of the peripheral device, and wherein said step of determining the network address of the peripheral device comprises comparing portions of said first data file with said pattern.

21. The memory of claim 20, wherein determining the network address of the peripheral device further comprises recognizing a match between a portion of said first data file and said pattern, identifying the portion as a network address, and identifying said network address as being the network address of the peripheral device.

22. The memory of claim 19, wherein said first data file includes the network address of a second data file associated with and including the network address of the peripheral device, and wherein determining the network address of the peripheral device comprises:

retrieving the second data file from the server device, wherein the second data file is a web page;

identifying one or more portions of the retrieved second data file as potential network addresses; and comparing portions of said second data file with said pattern.

23. The memory of claim 22, wherein determining the network address of the peripheral device further comprises recognizing a match between a potential network address of said second data file and said pattern, identifying the potential network address as a network address, and identifying said network address as being the network address of the peripheral device.

24. The memory of claim 23, wherein determining if a network address is the network address of the peripheral device further comprises testing said network address to determine whether said network address is the network address of the peripheral device.

25. The memory of claim 24, wherein said testing comprises sending a command to said network address.

26. The memory of claim 24, wherein determining if a network address is the network address of the peripheral device further comprises identifying said network address as being the network address of the peripheral device as a result of said testing.

27. A computing device for communicating with a peripheral device over a network that includes the peripheral device, the computing device, and a server device adapted to control the peripheral device, comprising:

means for creating a print job, wherein the print job is to be sent to the peripheral device;

means for determining, after the print job is created, a network address of the peripheral device by the client device in response to the creation of the print job, wherein the peripheral device has a network address that is not known to the client device, and wherein determining includes:

retrieving, after the print job is created, a first data file from the server device by the client device, wherein the first data file is a web page;

parsing, after the print job is created, by the client device the retrieved first data file into one or more portions, wherein the one or more portions comprise metatags, text blocks or sub-routines that have been extracted from the web page;

comparing, after the print job is created, by the client device the one or more portions of the retrieved first data file with a predetermined data formatting pattern indicative of a network address, wherein all of the metatags, text blocks or sub-routines are compared with the formatting pattern;

identifying, after the print job is created, by the client device one or more portions of the retrieved first data file as network addresses; and determining, after the print job is created, by the client device if a network address is the network address of the peripheral device, wherein determining includes sending a communication over the network;

means for addressing, after determining the network address of the peripheral device, the peripheral device using the determined network address of the peripheral device, wherein addressing the peripheral device occurs after the communication has been sent over the network; and means for communicating directly with the peripheral device, thereby bypassing the server device.

28. The computing device of claim 27, wherein said first data file includes the network address of the peripheral device, and wherein said means for determining the network address of the peripheral device comprises comparing portions of said first data file with said pattern.

29. The computing device of claim 28, wherein said means for determining the network address of the peripheral device further comprises means for recognizing a match between a portion of said first data file and said pattern, means for identifying the portion as a network address, and means for identifying said network address as being the network address of the peripheral device.

30. The computing device of claim 27, wherein said first data file includes the network address of a second data file associated with and including the network address of the peripheral device, and wherein said means for determining the network address of the peripheral device comprises:

means for retrieving the second data file from the server device, wherein the second data file is a web page;

means for identifying one or more portions of the retrieved second data file as potential network addresses; and means for comparing portions of said second data file with said pattern.

31. The computing device of claim 30, wherein said means for determining the network address of the peripheral device further comprises means for recognizing a match between a potential network address of said second data file and said pattern, means for identifying the potential network address as a network address, and means for identifying said network address as being the network address of the peripheral device.

32. The computing device of claim 31, wherein said means for determining if a network address is the network address of the peripheral device further comprises means for testing said network address to determine whether said network address is the network address of the peripheral device.

33. The computing device of claim 32, wherein said means for testing comprises means for sending a command to said network address.

34. The computing device of claim 33, wherein said means for determining if a network address is the network address of the peripheral device further comprises means for identifying said network address as being the network address of the peripheral device as a result of the determination performed by said means for testing.

35. A method for communicating between a client device and a peripheral device over a network that includes the peripheral device, the client device, and a server device adapted to control the peripheral device, wherein the peripheral device is a multi-function peripheral (MFP), wherein the method is performed by the client device, the method comprising:

creating a print job, wherein the print job is to be sent to the peripheral device;

determining, after the print job is created, a network address of the peripheral device by the client device in response to the creation of the print job, wherein the peripheral device has a network address that is not known to the client device, and wherein determining includes:

retrieving, after the print job is created, a first data file from the server device by the client device, wherein the first data file is a web page, wherein the web page is a network logical printer web page, a custom network logical printer web page, or an embedded device web page;

parsing, after the print job is created, by the client device the retrieved first data file into one or more portions, wherein the one or more portions comprise metatags, text blocks or sub-routines that have been extracted from the web page;

comparing, after the print job is created, by the client device the one or more portions of the retrieved first data file with a predetermined data formatting pattern indicative of a network address, wherein all of the metatags, text blocks or sub-routines are compared with the formatting pattern;

recognizing, after the print job is created, a match between a portion of said first data file and said pattern;

identifying, after the print job is created, by the client device one or more portions of the retrieved first data file as network addresses;

retrieving, after the print job is created, a second data file from the server device, wherein the second data file is a web page;

identifying, after the print job is created, one or more portions of the retrieved second data file as potential network addresses; and comparing portions of said second data file with said pattern;

recognizing, after the print job is created, a match between a potential network address of said second data file and said pattern; and determining, after the print job is created, by the client device if a network address is the network address of the peripheral device, wherein determining includes sending a communication over the network, wherein sending the communication comprises one of the following:

a Simple Network Management Protocol (SNMP) query to the peripheral device;

pinging the peripheral device; or sending a command to the peripheral device;

addressing, after determining the network address of the peripheral device, the peripheral device using the determined network address of the peripheral device, wherein addressing the peripheral device occurs after the communication has been sent over the network; and communicating directly with the peripheral device, thereby bypassing the server device.

* * * * *